Jan. 10, 1967  G. D. HANSEN  3,297,121

CLUTCH

Filed Aug. 3, 1964

INVENTOR.
GLEN DALE HANSEN
BY
*Moore, White & Burd*
ATTORNEYS

United States Patent Office 3,297,121
Patented Jan. 10, 1967

3,297,121
CLUTCH
Glen Dale Hansen, Maple Plain, Minn., assignor to Van Dale Corporation, Wayzata, Minn., a corporation of Minnesota
Filed Aug. 3, 1964, Ser. No. 386,973
6 Claims. (Cl. 192—26)

This invention is a single rotation clutch mechanism which can be engaged to produce one isolated rotation of a mechanism connected by the clutch to a driving structure or in the alternative held engaged to produce continuous rotation. It is novel in having the clutch and the driven member mounted concentrically about and supported by the driving shaft. Novelty also resides in the extreme simplicity of the structure which renders it particularly valuable in construction of farm machinery and the like. It also has a structure which renders it possible to have external easy contact for initiating a cycle of revolution and stopping the same at the end of the cycle.

Accordingly, it is an important object of this invention to provide a novel clutch structure.

It is a further object of this invention to have a novel clutch structure in which a driving shaft serves as a support for both the clutch and the member connected by the clutch to the driving shaft.

It is yet a further object of this invention to provide a clutch mechanism in which all of the mechanism is concentrically mounted about the driving shaft.

It is a further object of this invention to provide a clutch mechanism in which a spring embracing the driving member and the driven member can be expanded to release the same from each other or contracted to secure them together for mutual rotation.

A further object of this invention is to provide a clutch mechanism for connecting a driving shaft to a driven shaft in which the units may be disconnected easily.

It is a further object of this invention to provide a clutch assembly wherein the driven member is held engaged in the clutch assembly and with the drive shaft by a single cap-screw whereby the removal of said cap screw permits the disassembly of the driven member from the clutch assembly.

A still further object of this invention is to provide a simplified single rotation type clutch by means of a sleeve pinned to a driving shaft and a second sleeve concentrically mounted on the driving shaft adjacent to the pinned sleeve, both of which are embraced by a coil spring that may be alternately wound tightly around the two sleeves to secure them together and sprung away therefrom to release the sleeve that is rotatably secured on the driving shaft.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts and in which.

Figure 1:
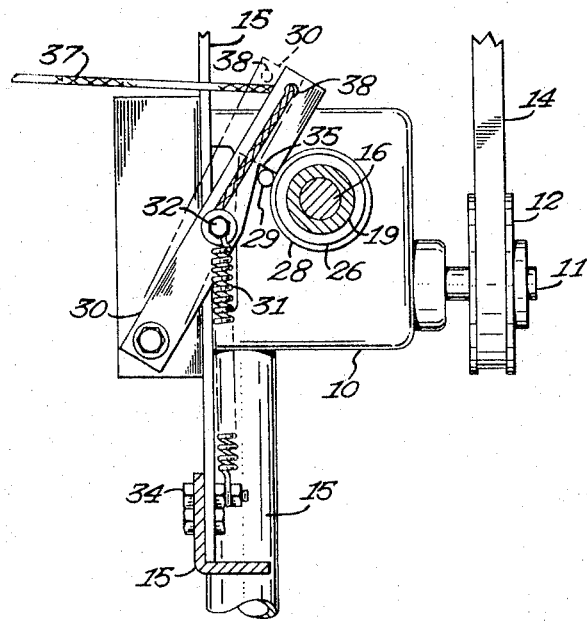
FIGURE 1 is a side partial side elevation partial vertical section of the clutch assembly taken on the line and in the direction of the arrows 1—1 on FIGURE 2; broken lines illustrate an adjusted position of parts.

At 10 is seen a gear box housing containing a speed reducer which is powered through its shaft 11 in a suitable manner here shown as a pulley 12 engaged by a V-belt 14. The gear box 10 is conventionally supported on a frame-work shown in fragment at 15 which may be part of a farm machine or the like. A driving shaft 16 extends from the speed reducer and supports on it the clutch assembly.

The clutch assembly comprises a sleeve 17 non-rotatably fixed to shaft 16 in any suitable manner here shown illustratively as the drive pin 18. A similar sleeve 19 is rotatably held on the shaft 16 in any suitable manner here shown illustratively as the washer 20 and the cap screw 21, the latter being threaded into the end of the shaft 16, and, preferably employing threads that would be tightened if the washer 20 in rotating with the shaft 16 should frictionally engage the sleeve 19 and the latter is stationary.

These two sleeves are embraced by a yielding helix 22 here shown illustratively as a coiled spring which has one end thereof identified as 24 engaging in an aperture 25 in collar 26. The collar 26 is releasably secured on the sleeve 19 against rotation in any suitable manner as by set screw 27a or the like. The other end 27 of spring 22 is engaged in a socket in a sleeve 28 which embraces spring 22.

When sleeve 28 is allowed to rotate freely, spring 22 frictionally engages sleeve 17. Since sleeve 17 is driven by shaft 16 in the same direction as the spring is formed, the spring 22 is wrapped evermore tightly about the sleeve 17 and is driven with it. This action simultaneously tightens the spring 22 about sleeve 19 to frictionally grip it also whereby a driving relationship is established between sleeve 17 and sleeve 19. So long as sleeve 28 is allowed to rotate freely, therefore, the two sleeves 17 and 19 will rotate together.

Figure 3:
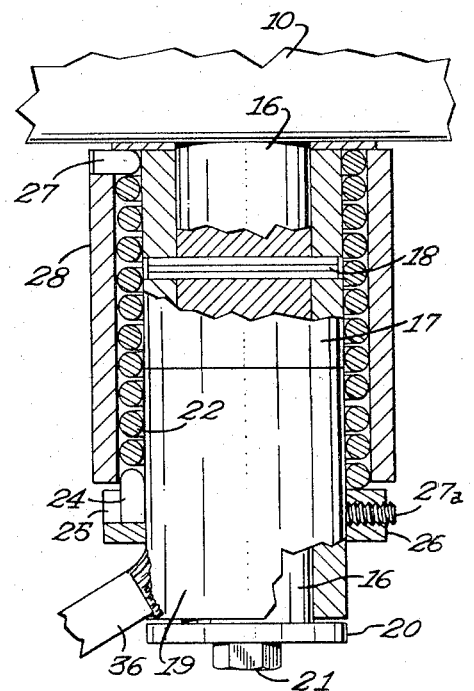
FIGURE 3 is an enlarged partial horizontal section partial top plan view of the clutch assembly with portions broken away to illustrate internal construction.
Figure 2:
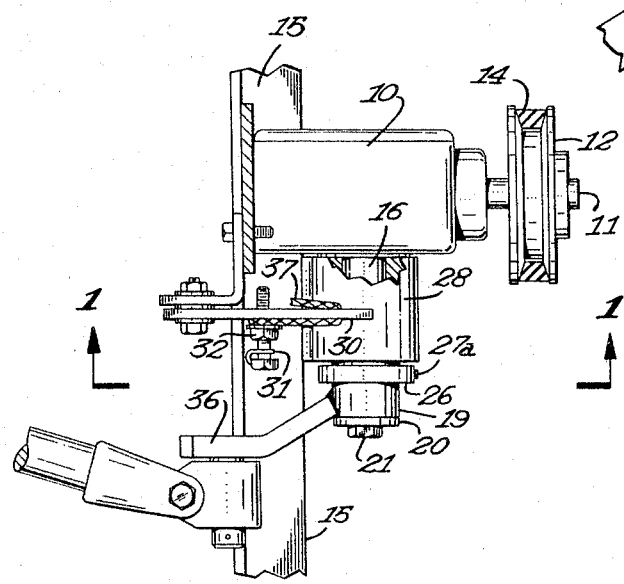
FIGURE 2 is a plan view of the structure shown in FIGURE 1 with portions broken away to illustrate internal construction.

A means for stopping sleeve 28 is provided, however, and a suitable one is a projection comprising a rod-like member 29 secured to the exterior of the sleeve 28. An arm 30 is arranged adjacent to sleeve 28 and yieldingly urged in a suitable manner as by spring 31 toward the sleeve 28. Spring 31 is secured in a suitable manner as by the nut and bolt assembly 32 to the arm 30 and a similar nut and bolt assembly 34 secured it to an accessible portion of frame 15. Arm 30 has a notch 35 which notch engages and holds against rotation the projection 29 and with it, of course, sleeve 28. So long as the sleeve 28 is held stationary by this means, any tendency on the part of sleeve 19 to rotate will move the end 24 of spring 22 in a direction with respect to the now stationary spring end 27 (held by sleeve 28) so as to uncoil and, therefore, expand the spring 22 thereby releasing the frictional grip it otherwise would have on the sleeves 17 and 19. Under these circumstances, sleeve 17 rotates freely within the spring and the shaft 16 within the sleeve 19. While the shaft 16 rotates freely thus, the sleeve 19 and anything secured to it such as the crank arm 36, shown only in fragment in FIGURE 3, will remain stationary.

A suitable means is provided for moving the arm 30 to the position illustrated in broken lines in FIGURE 1 here, illustratively, a cable 37. It is suitably secured to the arm 30 in any manner and by way of illustration is here extended through the hole 38 and down to the nut and bolt assembly 32 where it is clampingly held along with the end of spring 31. Any signal may be used to trigger the cycle by pulling on cable 37 and thereby pivoting the arm 30 so that the notch 35 no longer engages projection 29. Immediately spring 22 connects the two sleeves 17 and 19 together for rotation together. As soon as rotation has commenced, the signal may be released on cable 37 which causes it to drop back against the sleeve 28. Since the projection 29 is already past notch 35, however, no interference with the rotation of the sleeve 28 is encountered until one complete revolution has been made. At that time the arm 30 again stops projection 29 as shown in solid lines in FIGURE 1, whereupon the driving connection between shaft 16 and crank arm 36 is interrupted as described above. Obviously, if arm 30 is held in the broken line position, rotation of sleeve 28 continues for as many revolutions as the arm 30 is held in the broken line position. Specific means for triggering the clutch are not shown as any well known structure may be used for this purpose. Mechanical linkage, a solenoid, air or hydraulic motors or any other may be used to move and hold or release arm 30 for one rotation or as many rotations as the device to be driven requires. As collar 26 is releasably secured to sleeve 19, crank arm 36 may be adjusted to stop at any angular position desired relative to shaft 16. Also force other than that applied by shaft 16, such as by hand or inertia of structure secured to arm 36, applied to arm 36 in the direction it is driven by shaft 16 will cause it to move in that direction; the clutch will not prevent such movement.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A clutch assembly for connecting a driving shaft to a driven member comprising: two substantially cylindrical members adjacently mounted on said driving shaft, one cylindrical member being rotatably mounted on the driving shaft and the other cylindrical member being secured to said driving shaft, a resilient helix embracing said substantially cylindrical members, means securing one end of said resilent helix to said rotatably mounted cylindrical member, an outer member secured to the other end of the helix, and arm means movable into and out of engagement of said outer member for selectively holding and releasing the outer member, and means secured to the outer end of said driving shaft that is larger in diameter than said driving shaft whereby said rotatably mounted cylindrical member is held against substantial axial movement on said driving shaft between said means secured to the outer end of said driving shaft and said non-rotatably secured cylindrical member.

2. The structure of claim 1 wherein the means secured to the outer end of said driving shaft is, a washer of larger diameter than said driving shaft positioned at the outer end thereof, a threaded well extending axially into said driving shaft, and a cap screw engaging said washer threadably engaging said threaded well to secure said washer to the end of said driving shaft, said washer holding the rotatable cylindrical member in assembled relation with the driving shaft.

3. The structure of claim 1 wherein the outer member secured to the other end of said resilient helix comprises an outer sleeve embracing said helix, a stop means secured to the outer of said outside sleeve, said arm means movably mounted near said outside sleeve and movable into and out of engagement with said outside sleeve, and means on said arm means for engaging and holding said stop means when said arm is in contact with said outer sleeve.

4. A clutch assembly for connecting a driving shaft to a driven member comprising; a first sleeve fixed with respect to rotation on said driving shaft, a second sleeve rotatably mounted on said driving shaft adjacent said first sleeve, a spring embracing said first and second sleeve, an outside third sleeve embracing said spring, one end of said spring being fixed to said outside sleeve, a collar secured to said second sleeve rotatable on said driving shaft, the other end of said spring fixed to said collar, a notched arm for selectively stopping and releasing said outside sleeve pivotally mounted adjacent said outside sleeve, a stop means secured to said third sleeve and engagable by said notched arm, and resilient means secured to said notched arm yieldingly urging it toward said outside third sleeve.

5. The clutch structure of claim 4 further characterized with a washer of larger diameter than said driving shaft positioned at the outer end thereof, a threaded well extending axially into said driving shaft, and a cap screw engaging said washer and threadably engaging said threaded well to secured said washer to the end of said driving shaft.

6. The structure of claim 4 including releasable means for securing said collar to said rotatably mounted second sleeve whereby said spring and said second sleeve may be secured together in various desired angular relationships.

References Cited by the Examiner
UNITED STATES PATENTS

| | | | |
|---|---|---|---|
| 677,872 | 7/1901 | Locke | 192—41 |
| 1,964,310 | 6/1934 | Bethenod | 192—41 |
| 2,475,432 | 7/1949 | Marihart | 192—41 |
| 2,571,232 | 10/1951 | Gorske | 192—41 |
| 2,685,949 | 8/1954 | Dunlap | 192—41 |
| 2,971,394 | 2/1961 | Christensen. | |
| 2,979,925 | 4/1961 | Hungerford | 192—41 X |
| 3,181,669 | 5/1965 | Kunde et al. | 192—81 |

DAVID J. WILLIAMOWSKY, *Primary Examiner.*

A. McKEON, *Assistant Examiner.*